United States Patent [19]
Nishigaki et al.

[11] Patent Number: 5,524,724
[45] Date of Patent: Jun. 11, 1996

[54] THROTTLE VALVE CONTROL APPARATUS

[75] Inventors: Kazuhiro Nishigaki, Gifu; Hitoshi Tasaka, Chiryu; Shigeru Kamio, Nagoya, all of Japan

[73] Assignee: Nippondenso Co., Ltd., Kaiya, Japan

[21] Appl. No.: 111,066

[22] Filed: Aug. 24, 1993

[30] Foreign Application Priority Data

Aug. 25, 1992 [JP] Japan .................................. 4-226037
Jul. 14, 1993 [JP] Japan .................................. 5-174058

[51] Int. Cl.⁶ .................................................. B60K 31/00
[52] U.S. Cl. ........................ 180/176; 123/361; 180/177; 364/426.04
[58] Field of Search ..................... 123/352, 361, 123/396; 180/175, 176, 177, 179; 364/426.04

[56] References Cited

U.S. PATENT DOCUMENTS

| | | | |
|---|---|---|---|
| 4,879,657 | 11/1989 | Tamura et al. | 364/431.07 |
| 5,018,496 | 5/1991 | Buchl . | |
| 5,048,631 | 9/1991 | Etoh | 180/179 |
| 5,086,740 | 2/1992 | Wiggins et al. | 180/179 X |
| 5,096,015 | 3/1992 | Akishino et al. | 180/179 |
| 5,137,104 | 8/1992 | Etoh | 180/179 |
| 5,177,683 | 1/1993 | Oo et al. | 180/179 X |

FOREIGN PATENT DOCUMENTS

| | | |
|---|---|---|
| 559967 | 3/1993 | Japan . |
| 559969 | 3/1993 | Japan . |
| 586906 | 4/1993 | Japan . |
| 512596 | 5/1993 | Japan . |
| 9001115 | 2/1990 | WIPO . |

*Primary Examiner*—Mitchell J. Hill
*Assistant Examiner*—Michael Mar
*Attorney, Agent, or Firm*—Cushman Darby & Cushman

[57] ABSTRACT

A throttle valve control apparatus serves to electrically drive a throttle valve which adjusts a rate of air flow into an engine mounted on a vehicle. The throttle valve control apparatus includes a lever connected to the throttle valve for movement in an opening direction and a closing direction together with the throttle valve. An opening degree limiting member is located in a side of the lever which corresponds to the opening direction. A spring urges the opening degree limiting member in a direction of closing the throttle valve. An accelerator interlocking and driving device serves to move the opening degree limiting member in accordance with a degree of operation of an accelerator member. A throttle actuator functions to adjust a degree of opening of the throttle valve. A vehicle speed sensor functions to detect a running speed of the vehicle. A guard actuator serves to adjust a position of the opening degree limiting member. An auto cruise control device serves to control the throttle actuator and to feedback-control the vehicle speed detected by the vehicle speed sensor at a target vehicle speed. A guard control means serves to control the guard actuator and to adjust the position of the opening degree limiting member at a position slightly separated from a position of the lever in the opening direction during control by the auto cruise control device. A changing device serves to change control of the position of the opening degree limiting member by the guard control device and control of the position of the opening degree limiting member by the accelerator interlocking and driving device with each other.

12 Claims, 14 Drawing Sheets

# THROTTLE VALVE CONTROL APPARATUS

BACKGROUND OF THE INVENTION

1. Field of the Invention

This invention generally relates to an apparatus for controlling a throttle valve, and specifically relates to a throttle valve control apparatus including a guard mechanism for mechanically limiting a maximum degree of opening of a throttle valve.

2. Description of the Prior Art

Some of advanced automotive vehicles have a link-less throttle system in which the degree of depression of an accelerator pedal is converted into an electric signal, and a throttle valve is driven by an actuator in response to the electric signal.

The link-less throttle system of a given type is equipped with a guard mechanism for mechanically limiting the maximum degree of opening of the throttle valve. Specifically, the guard mechanism is mechanically connected to the accelerator pedal. To cope with a failure of a control system between the accelerator pedal and the throttle valve which might cause wrong positioning of the throttle valve, the guard mechanism prevents the actual degree of opening of the throttle valve from exceeding a target degree which is determined by the degree of depression of the accelerator pedal. Normally, the guard mechanism allows the actual degree of opening of the throttle valve to follow the target degree.

Automotive cruise control or automotive engine idle speed control requires movement of a throttle valve independent of the position of an accelerator pedal. Thus, the link-less throttle system of the above-mentioned type is generally unsuited for use in automotive cruise control or automotive engine idle speed control.

Japanese published unexamined patent application 63-201335 discloses an advanced link-less throttle system which can be used in automotive cruise control. In the link-less throttle system of Japanese application 63-201335, when system conditions are normal, the degree of opening of a throttle valve which is determined by a guard mechanism is held by a vacuum responsive actuator at a degree corresponding to the maximum degree of opening of the throttle valve (that is, the fully-open position of the throttle valve). Thus, in this case, the guard mechanism is disabled and therefore the throttle valve can be moved independent of the degree of depression of an accelerator pedal so that automotive cruise control can be executed. On the other hand, when a system failure is detected, the vacuum responsive actuator moves the guard mechanism into engagement with the throttle valve to urge the throttle valve toward its closed position. At the same time, the vacuum responsive actuator moves the guard mechanism into engagement with the accelerator pedal, and hence the degree of depression of the accelerator pedal is mechanically transmitted to the throttle valve via the guard mechanism. In this case, the guard mechanism is enabled, and the throttle valve is moved in accordance with the degree of depression of the accelerator pedal.

In the link-less throttle system of Japanese application 63-201335, when a system failure is detected, the accelerator pedal is subjected to both the force of an accelerator pedal return spring and the force of the vacuum responsive actuator. On the other hand, under normal system conditions, the accelerator is free from the force of the vacuum responsive actuator. Thus, when the accelerator pedal is depressed to terminate cruise control and to accelerate a vehicle from a cruise control speed, only the force of the return spring counteracts the depression of the accelerator pedal so that the depression of the accelerator pedal is too easy. The easy depression of the accelerator pedal tends to cause excessive depression thereof which results in a reduction of a vehicle drivability or a vehicle fuel consumption rate.

In the link-less throttle system of Japanese application 63-201335, when a system failure is detected, it takes a certain length of time to move the guard mechanism from the disabled state into an operable (enabled) state. This length of time generally causes a reduction of system response characteristics.

SUMMARY OF THE INVENTION

It is an object of this invention to provide an improved throttle valve control apparatus.

This invention provides a throttle valve control apparatus for electrically driving a throttle valve which adjusts a rate of air flow into an engine mounted on a vehicle which comprises a lever connected to the throttle valve for movement in an opening direction and a closing direction together with the throttle valve; an opening degree limiting member located in a side of the lever which corresponds to the opening direction; a spring urging the opening degree limiting member in a direction of closing the throttle valve; an accelerator member; accelerator interlocking and driving means for moving the opening degree limiting member in accordance with a degree of operation of the accelerator member; a throttle actuator for adjusting a degree of opening of the throttle valve; a vehicle speed sensor for detecting a running speed of the vehicle; a guard actuator for adjusting a position of the opening degree limiting member; auto cruise control means for controlling the throttle actuator and feedback-controlling the vehicle speed detected by the vehicle speed sensor at a target vehicle speed; guard control means for controlling the guard actuator and adjusting the position of the opening degree limiting member at a position slightly separated from a position of the lever in the opening direction during control by the auto cruise control means; and changing means for changing control of the position of the opening degree limiting member by the guard control means and control of the position of the opening degree limiting member by the accelerator interlocking and driving means with each other.

According to this invention, when the operation of the vehicle is in an auto cruise mode, the guard control means controls the position of the opening degree limiting member at a position slightly separated from the throttle opening degree in the opening direction. The changing means serves to change control of the position of the opening degree limiting member by the guard control means and control of the position of the opening degree limiting member by the accelerator interlocking and driving means with each other. Thus, during the operation of the vehicle in the auto cruise mode, the opening degree limiting member does not interfere with movement of the lever. When the operation of the vehicle changes from the auto cruise mode to a normal control mode, the opening degree limiting member limits the opening-direction position of the lever to limit the maximum degree of opening of the throttle valve.

Since the position of the opening degree limiting member is controlled at a position slightly separated from the throttle valve opening degree in the opening direction during the operation of the vehicle in the auto cruise mode, the difference between the position of the opening degree limiting member during the operation of the vehicle in the auto cruise mode and the position of the opening degree limiting member during the operation of the vehicle in the normal control mode is smaller than the entire movable range of the opening degree limiting member. Therefore, when the operation of the vehicle is changed from the auto cruise mode to the normal control mode, the opening degree limiting member can quickly change from the state driven by the guard actuator to the state driven by the accelerator interlocking and driving means. Thus, upon the change from the auto cruise mode to the normal control mode, the maximum degree of opening of the throttle valve can be immediately limited.

The change from the auto cruise mode to the normal control mode may be executed when a malfunction of a control circuit is detected. In this case, after the detection of the malfunction, the maximum degree of opening of the throttle valve can be immediately limited and hence an excessive increase in the engine power output can be suppressed.

The change from the auto cruise mode to the normal control mode may be executed when the vehicle is accelerated from the cruise controlled state. In this case, the degree of operation of the accelerator member is increased. In addition, upon the change from the auto cruise mode to the normal control mode to accelerate the vehicle from the cruise controlled state, the opening degree limiting member immediately stats to be driven by the accelerator interlocking and driving means. Therefore, the accelerator member immediately receives a spring force. In other words, the accelerator member immediately receives an appropriate force reacting against the force of operation thereof. In this way, during the acceleration of the vehicle from the cruise controlled state, it is possible to prevent the operation of the accelerator member from being excessively easy so that the vehicle driver can have good feeling in operating the accelerator member.

During the operation of the vehicle in the normal control mode, the degree of opening of the throttle valve may be adjusted, in a range separated from the position of the opening degree limiting member in the closing direction, in response to the degree of operation of the accelerator member. Acceleration of the vehicle from the cruise controlled state may be detected by the fact that the degree of operation of the accelerator member exceeds a degree corresponding to the throttle opening degree which occurs in the operation of the vehicle in the auto cruise mode. In this case, as the degree of operation of the accelerator member is increased, acceleration of the vehicle from the cruise controlled state is detected soon and then the throttle valve starts to be controlled in response to the degree of operation of the accelerator member. Immediately after the acceleration is detected, the opening degree limiting member is driven by the accelerator interlocking and driving means. Therefore, when the acceleration starts, the accelerator member receives a spring force and thus receives an appropriate force reacting against the force of operation thereof. Accordingly, the driver can have a feel of the acceleration through the operation of the accelerator member. In addition, it is possible to prevent the accelerator member from being operated at an excessive degree.

DESCRIPTION OF THE FIRST PREFERRED EMBODIMENT

Figure 1:
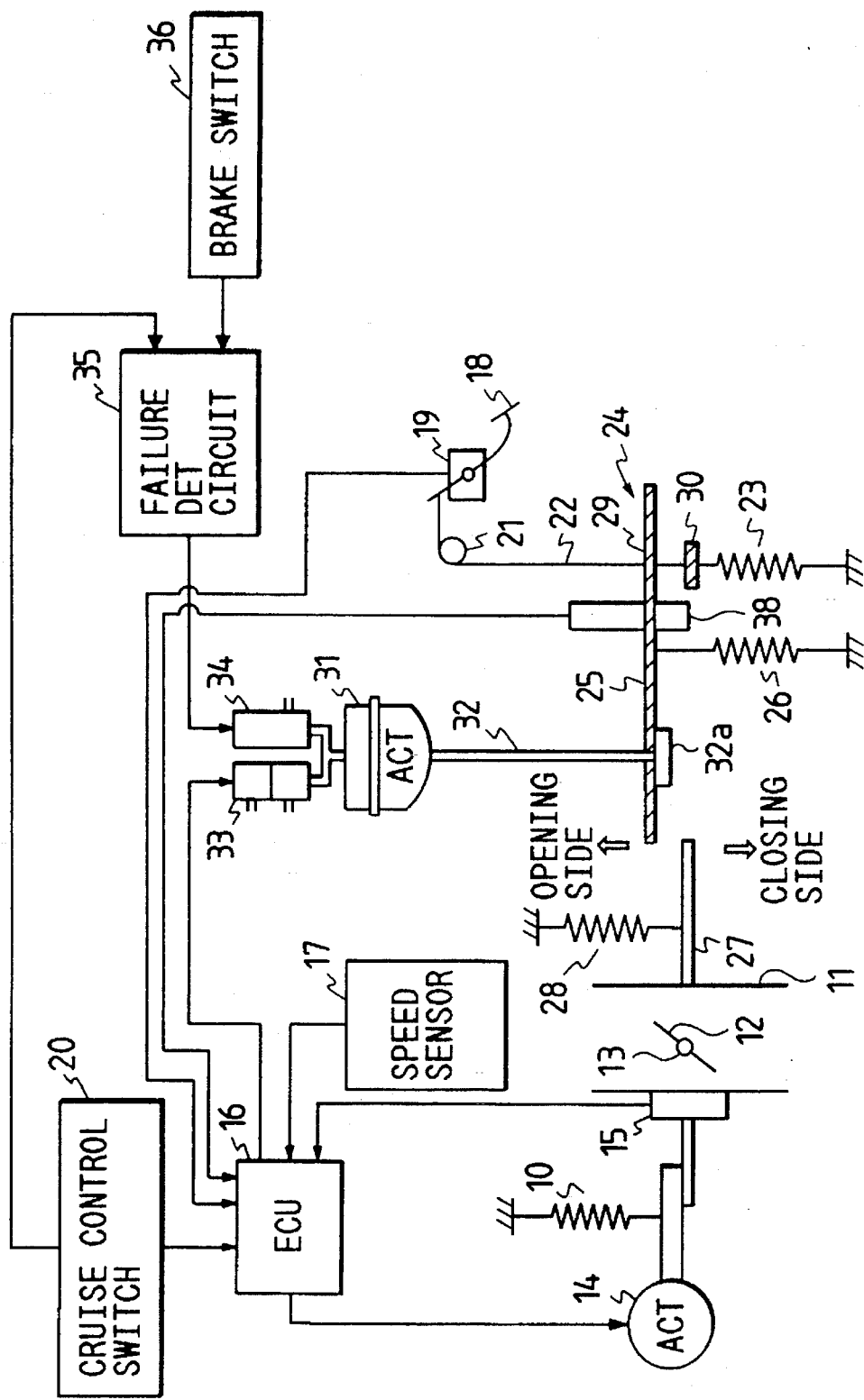
FIG. 1 is a diagram of a throttle valve control apparatus according to a first embodiment of this invention.

With reference to FIG. 1, a throttle body 11 accommodates a rotatable throttle valve 12 which is supported by a shaft 13. An actuator 14 for driving the throttle valve 12 includes a DC motor or a stepping motor. The throttle actuator 14 has an output shaft which can be coupled with the shaft 13 of the throttle valve 12. A return spring 10 urges the output shaft of the throttle actuator 14 in the direction of closing the throttle valve 12 (which is also referred to as the closing direction).

The throttle body 11 is provided with a throttle opening degree sensor or a position sensor 15 for detecting the degree of opening of the throttle valve 12 (that is the throttle opening degree or the throttle angular position). The throttle opening degree sensor 15 outputs a signal representative of the detected throttle opening degree to an electronic control unit 16 which will be referred to as the ECU 16 hereinafter. A vehicle speed sensor 17 detects the speed of a vehicle body, and outputs a signal representative of the detected vehicle speed to the ECU 16. An accelerator sensor 19 including a position sensor detects the degree of depression of an accelerator pedal 18, and outputs a signal representative of the detected accelerator depression degree to the ECU 16. A guard opening degree sensor 38 associated with a guard mechanism 24 detects a guard opening degree (a guard throttle opening degree) determined by the guard mechanism 24. The guard opening degree sensor 38 outputs a signal representative of the detected guard opening degree to the ECU 16. The guard opening degree corresponds to a degree of opening of the throttle valve 12 which is determined by the guard mechanism 24. A cruise control switch 20 generates an instruction signal related to automotive cruise control, and outputs the cruise control instruction signal to the ECU 16.

The ECU 16 controls the throttle actuator 14 in response to the output signals of the devices 15, 17, 19, 20, and 38. The accelerator pedal 18 is connected to a return spring 23 via a wire 22 supported on a roller 21.

The guard mechanism 24 serves to mechanically limit the maximum degree of opening of the throttle valve 12. The guard mechanism 24 includes an opening degree limiting member 25 and a spring 26. The opening degree limiting member 25 can translate in a vertical direction (an upward/downward direction) as viewed in FIG. 1. The spring 26 urges the opening degree limiting member 25 in the direction of closing the throttle valve 12, that is, in the downward direction. A left-hand end of the opening degree limiting member 25 is located above a lever 27 which rotates together with the throttle valve 12. A spring 28 urges the lever 27 in the direction of opening the throttle valve 12, that is, the upward direction. The direction of opening the throttle valve 12 is also referred to as the opening direction. The original force of the spring 28 is set weaker than the original force of the spring 26.

Normally, the throttle valve 12 is urged by the spring 28 toward its fully-open position, and the throttle valve 12 is allowed to open until the lever 27 encounters tile opening degree limiting member 25. When the lever 27 encounters the opening degree limiting member 25, the throttle valve 12 is prevented from further opening by the force of the spring 26 which acts on the opening degree limiting member 25. Thus, the maximum degree of opening of the throttle valve 12 is normally limited to the guard opening degree which is determined by the position of the opening degree limiting member 25 in the guard mechanism 24.

A right-had portion of the opening degree limiting member 25 has a hole 29 through which the wire 22 connected to the accelerator pedal 18 extends. A stopper 30 fixed to the wire 22 is located below the opening degree limiting member 25. When the accelerator pedal 18 is depressed, the wire 22 and the stopper 30 move upward so that the stopper 30 can contact the opening degree limiting member 25. It should be noted that FIG. 1 shows conditions where automotive cruise control is being executed and the accelerator pedal 18 is in its undepressed position.

The guard opening degree, that is, the position of the opening degree limiting member 25, can be varied by an actuator 31 for the guard mechanism 24. The guard actuator 31 includes a vacuum responsive actuator having a diaphragm and an output rod 32. The output rod 32 moves up and down in accordance with displacement of the diaphragm. A lower end of the output rod 32 is connected to a left-hand portion of the opening degree limiting member 25 via a stopper 32a. The opening degree limiting member 25 moves up and down as the output rod 32 moves up and down.

An electromagnetic control valve 33 and an electromagnetic relief valve 34 are connected to the guard actuator 31. The control valve 33 is of, for example, the three-way type. A vacuum source (not shown) and an atmospheric pressure source (not shown) are connected to the control valve 33. The control valve 33 can selectively supply a vacuum and an atmospheric pressure, adjusting the level of a pressure (a vacuum) applied to the guard actuator 31. Since the position of the output rod 32 of the guard actuator 31 depends on the level of the vacuum applied to the guard actuator 31, the guard opening degree (that is, the position of the opening degree limiting member 25) can be adjusted in accordance with the level of the vacuum applied to the guard actuator 31. Operation of the control valve 33 is controlled by the ECU 16.

The relief valve 34 is connected to the atmospheric pressure source. The relief valve 34 serves to selectively apply the atmospheric pressure to the guard actuator 31. Operation of the relief valve 34 is controlled by a failure detection circuit 35. The failure detection circuit 35 determines whether or not a control system for the throttle valve 12 is wrong by referring to the output signal of the cruise control switch 20 and the output signal of a vehicle brake switch 36. When the control system is determined to be wrong, the failure detection circuit 35 drives the relief valve 34 to apply the atmospheric pressure to the guard actuator 31 and thereby to move the opening degree limiting member 25 toward its lowermost position.

The ECU 16 includes a microcomputer or a similar device having a combination of an input/output port, a CPU, a RAM, and a ROM. The ECU 16 operates in accordance with a program stored in the ROM. The program includes a main routine and various control routines. Some of the control routines relate to normal throttle opening degree control responsive to the depression of the accelerator pedal 18, throttle opening degree control responsive to the vehicle speed during the execution of automotive cruise control, and guard opening degree control responsive to the throttle opening degree during the execution of automotive cruise control. Specifically, during the execution of automotive cruise control, the ECU 16 controls the guard actuator 31 in response to the throttle opening degree so that the guard opening degree will remain greater than the throttle opening degree by a given quantity.

Figure 2:
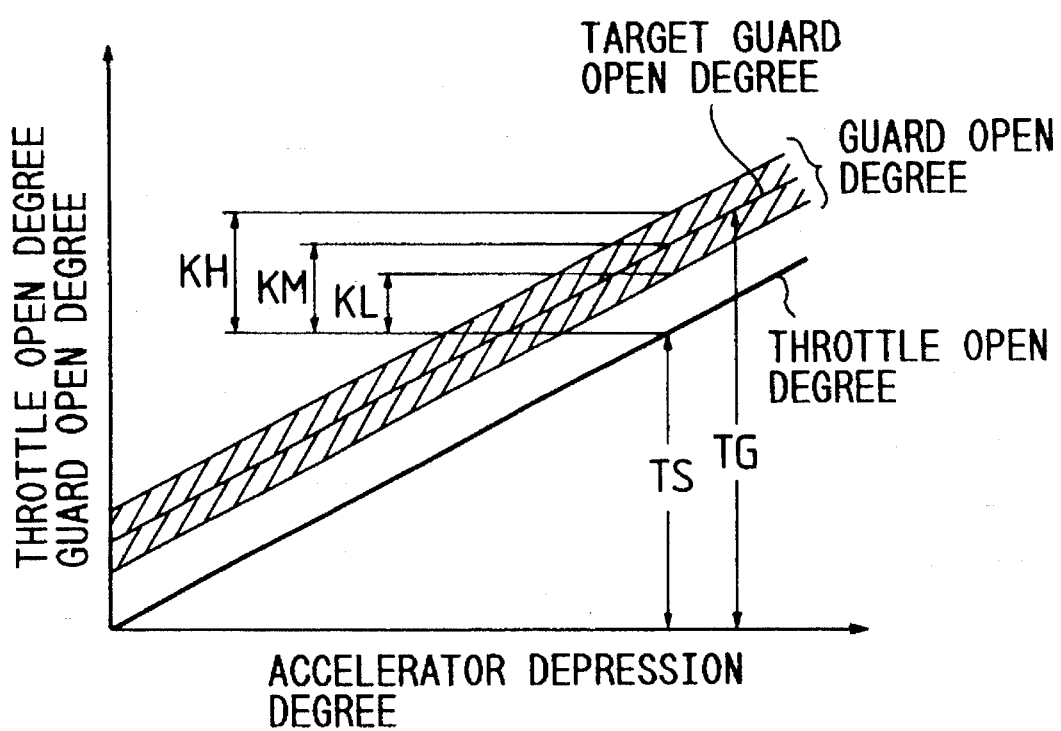
FIG. 2 is a diagram of the relation among a throttle opening degree, a guard opening degree, and a degree of depression of an accelerator pedal in the apparatus of FIG. 1.

FIG. 2 shows the relation between the throttle opening degree and the guard opening degree which occurs during the execution of automotive cruise control. In FIG. 2, the hatched region extending at and around a line denoting a target guard opening degree is a good region where the guard opening degree exists. During the execution of automotive cruise control, the throttle opening degree is adjusted in response to the vehicle speed. In FIG. 2, the throttle opening degree and the guard opening degree are indicated as a function of the degree of depression of the accelerator pedal 18.

With reference to FIG. 2, the guard opening degree is controlled into the region between a lower limit greater than the throttle opening degree TS by a value KL and an upper limit greater than the throttle opening degree TS by a value KH. The values KL and KH are suitably chosen in consideration of characteristics of automotive cruise control. In addition, the values KL and KH are chosen so that, when the accelerator pedal 18 is depressed to terminate automotive cruise control and to accelerate a vehicle from a cruise control speed, the stopper 30 can promptly encounter the opening degree limiting member 25 and thus the force of the spring 26 can quickly counteract the depression of the accelerator pedal 18. In FIG. 2, a value KM intermediate between the values KL and KH corresponds to the target guard opening degree. An angle (for example, about 4°) corresponding to the value KM is set smaller than an angle (for example, about 5°) corresponding to the difference between the guard opening degree and the throttle opening degree which occurs during the execution of normal throttle opening degree control. This setting of the value KM enables the accelerator pedal 18 to quickly receive an appropriate load upon acceleration of the vehicle from a cruise controlled state.

Figure 3:
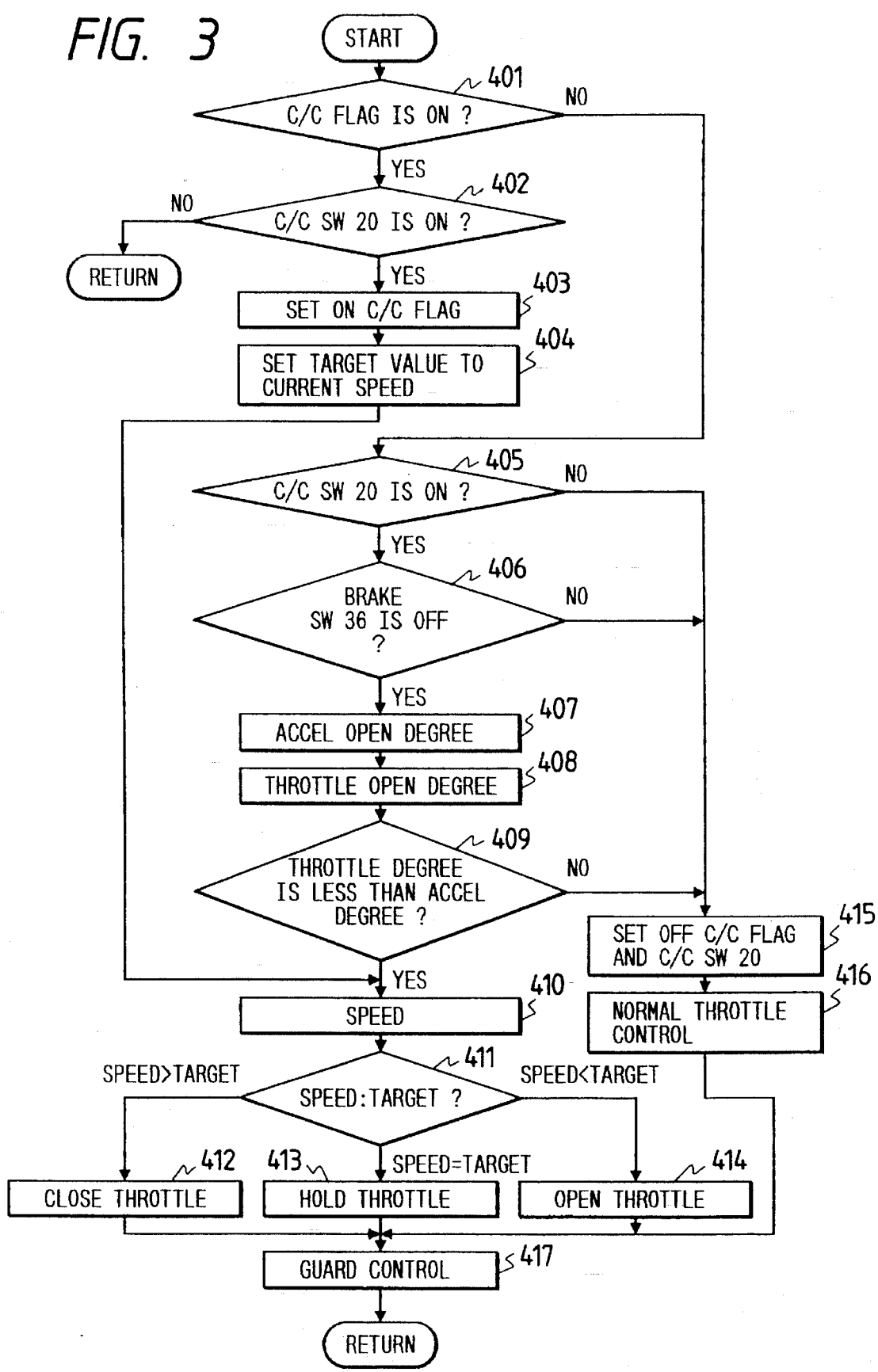
FIG. 3 is a flowchart of a segment of a program for operating an ECU in FIG. 1.

As previously described, the ECU 16 operates in accordance with a program. FIG. 3 is a flowchart of a segment of the program which relates to throttle opening degree control and guard opening degree control. The program segment of FIG. 3 is periodically reiterated.

As shown in FIG. 3, a first step 401 of the program segment determines whether or not a cruise control (C/C) execution flag is in an ON state. When the C/C execution flag is in the ON state, the program advances from the step 401 to a step 402. Otherwise, the program advances from the step 401 to a step 405.

The step 402 determines whether or not the output signal of the C/C switch 20 is in an ON state. When the output signal of the C/C switch 20 is in the ON state, the program advances from the step 402 to a step 403. Otherwise, the program exists from the step 402 and returns to the main routine so that the current execution cycle of the program segment ends.

The step 403 sets the C/C execution flag to the ON state. A step 404 following the step 403 sets a target vehicle speed to the present vehicle speed derived from the output signal of the vehicle speed sensor 17. After the step 404, the program advances to a step 410.

The step 410 derives the current vehicle speed from the output signal of the vehicle speed sensor 17. A step 411 following the step 410 compares the current vehicle speed, which is derived in the step 410, with tile target vehicle speed set by the step 404. When the current vehicle speed is higher than the target vehicle speed, the program advances from the step 410 to a step 412 which controls the throttle actuator 14 to reduce the degree of opening of the throttle valve 12. When the current vehicle speed is equal to the target vehicle speed, the program advances from the step 410 to a step 413 which controls the throttle actuator 14 to hold the degree of opening of the throttle valve 12 unchanged. When the current vehicle speed is lower than the target vehicle speed, the program advances from the step 410 to a step 414 which controls the throttle actuator 14 to increase the degree of opening of the throttle valve 12.

After the steps 412, 413, and 414, the program advances to a block 417 for controlling the guard actuator 31 to execute adjustment of the guard opening degree. The guard opening degree control block 417 will be described in detail later. After the block 417, the program returns to the main routine and the current execution cycle of the program segment ends.

The step 405 determines whether or not the output signal of the C/C switch 20 is in the ON state. When the output signal of the C/C switch 20 is in the ON state, the program advances from the step 405 to a step 406. Otherwise, the program advances from the step 405 to a step 415.

The step 406 determines whether or not the output signal of the brake switch 36 is in an ON state. When the output signal of the brake switch 36 in the ON state, the program advances from the step 406 to a step 407. Otherwise, the program advances from the step 406 to the step 415.

The step 407 derives the current degree of depression of the accelerator pedal 18 from the output signal of the accelerator sensor 19. A step 408 following the step 407 derives the current degree of opening of the throttle valve 12 from the output signal of the throttle opening degree sensor 15.

A step 409 following the step 407 determines whether or not a throttle opening degree which corresponds to the current degree of depression of the accelerator pedal 18 is greater than the current degree of opening of the throttle valve 12. When the throttle opening degree which corresponds to the current degree of depression of the accelerator pedal 18 is equal to or less than the current degree of opening of the throttle valve 12, the program advances from the step 409 to the step 410. On the other hand, when the throttle opening degree which corresponds to the current degree of depression of the accelerator pedal 18 is greater than the current degree of opening of the throttle valve 12, that is, when the accelerator pedal 18 is depressed to accelerate the vehicle from the cruise control speed, the program advances from the step 409 to the step 415.

The step 415 sets the C/C execution flag to an OFF state. In addition, the step 415 sets the C/C switch 20 to an OFF state. A block 416 following the step 415 executes the normal throttle opening degree control responsive to the depression of the accelerator pedal 18. After the block 416, the program advances to the guard opening degree control block 417.

Figure 5:
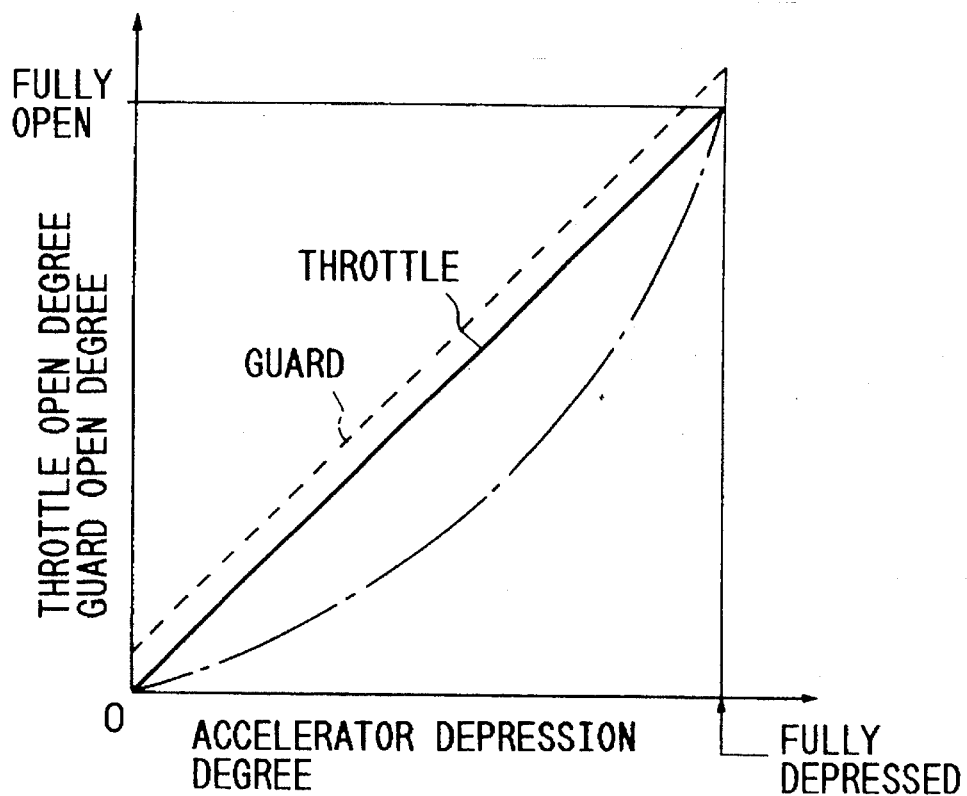
FIG. 5 is a diagram of the relation among a throttle opening degree, a guard opening degree, and a degree of depression of an accelerator pedal which occurs during normal control in the apparatus of FIG. 1.

Specifically, the block 416 drives the control valve 33 to suspend operation of the guard actuator 31 so that the opening degree limiting member 25 can assume its lowermost position. The block 416 executes the normal throttle opening degree control responsive to the depression of the accelerator pedal 18. In more detail, the block 416 drives the throttle actuator 14 and thereby controls the degree of opening of the throttle valve 12 in response to the degree of depression of the accelerator pedal 18 according to predetermined characteristics shown in FIG. 5. During the execution of the normal throttle opening degree control, the stopper 30 remains in contact with the opening degree limiting member 25, and the guard opening degree determined by the position of the opening degree limiting member 25 is proportional to the degree of depression of the accelerator pedal 18 as denoted by the dash line in FIG. 5. In addition, the degree of opening of the throttle valve 12 is proportional to the degree of depression of the accelerator pedal 18 as denoted by the solid line in FIG. 5. In this case, the guard opening degree corresponds to a throttle opening degree which remains greater than the degree of opening of the throttle valve 12. It should be noted that the degree of opening of the throttle valve 12 and the degree of depression of accelerator pedal 18 may be in a relation denoted by the dot dash line in FIG. 5.

Figure 4:
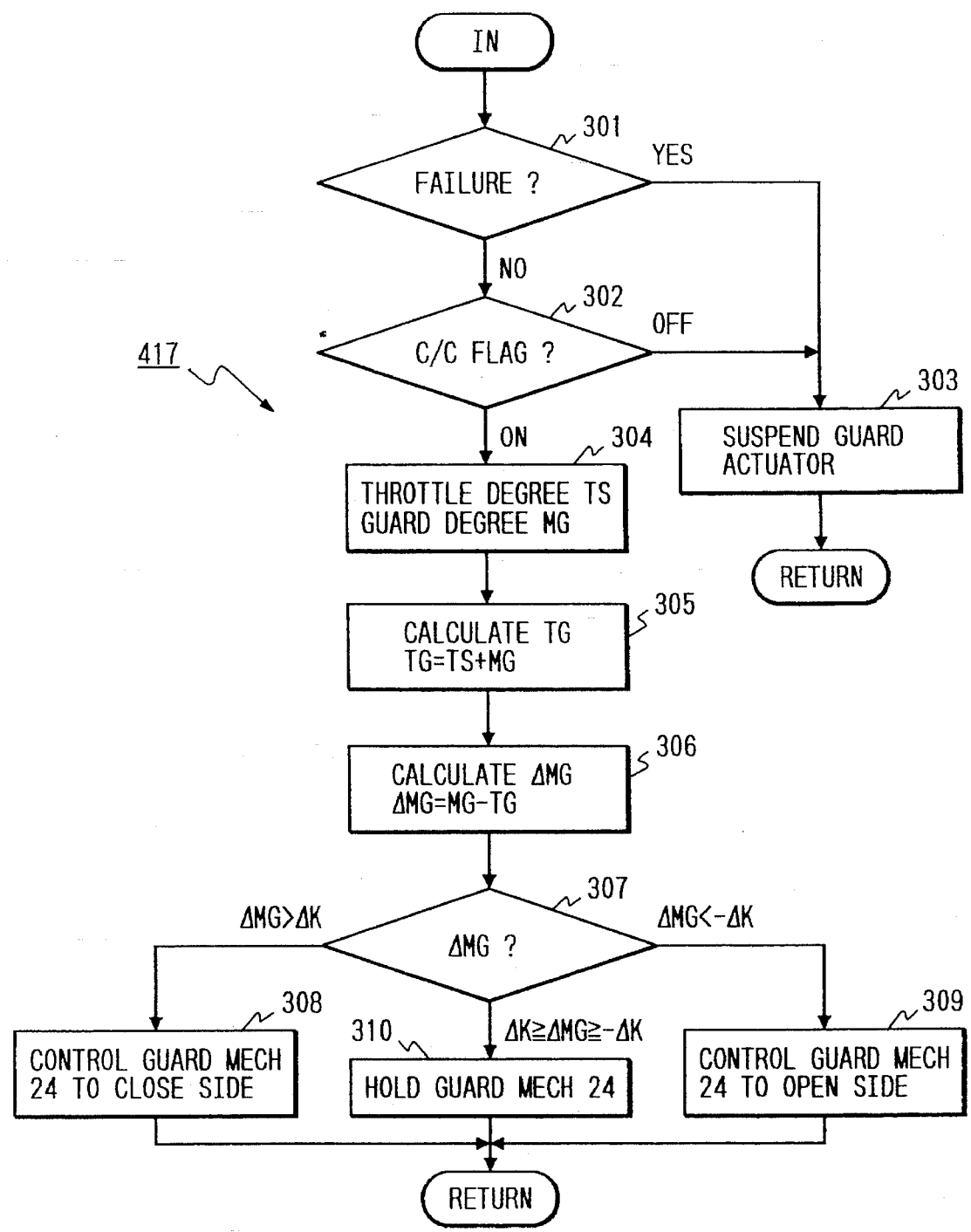
FIG. 4 is a flowchart of an internal structure of a block in FIG. 3.

FIG. 4 shows an internal structure of the guard opening degree control block 417. As shown in FIG. 4, a first step 301 in the block 417 determines whether or not a failure flag is in an ON state. When the failure flag is in the ON state, the program advances from the step 301 to a step 303.

Otherwise, the program advances from the step 301 to a step 302.

It should be noted that the failure flag is controlled by a failure detection routine (not shown) of the program. Specifically, the failure detection routine determines whether or not a control system including the throttle actuator 14, the ECU 16, and the accelerator sensor 19 is wrong. When the control system is determined to be wrong, the failure detection routine sets the failure flag to the ON state. When the control system is determined to be not wrong, the failure detection routine sets the failure flag to an OFF state.

The step 302 determines whether or not the C/C execution flag is in the ON state. When the C/C execution flag is in the ON state, the program advances from the step 302 to a step 304. Otherwise, the program advances from the step 302 to the step 303.

The step 303 drives the control valve 33 to suspend operation of the guard actuator 31 so that the stopper 32a and the opening degree limiting member 25 can assume their lowermost positions. As a result, tile opening degree limiting member 25 comes into contact with tile stopper 30, and the accelerator pedal 18 receives both the forces of the springs 23 and 26. After the step 303, the program returns to tile main routine and the current execution cycle of the program segment ends.

The step 304 derives tile current degree TS of opening of the throttle valve 12 from the output signal of the throttle opening degree sensor 15. In addition, the step 304 derives the actual current guard opening degree MG from the output signal of the guard opening degree sensor 38.

A step 305 subsequent to the step 304 calculates a target guard opening degree TG from the current throttle opening degree TS according to the following equation.

$$TG = TS + KM \quad (1)$$

where KM denotes a value intermediate between the lower limit KL and the upper limit KH of the guard opening degree. Specifically, the value KM is given as:

$$KM = (KL + KH)/2 \quad (2)$$

A step 306 subsequent to the step 305 calculates the difference $\Delta MG$ between the target guard opening degree TG and the actual guard opening degree MG according to the following equation.

$$\Delta MG = MG - TG \quad (3)$$

A step 307 following the step 306 compares the difference $\Delta MG$ with values $\Delta K$ and $-\Delta K$. The values $\Delta K$ and $-\Delta K$ are given as:

$$\Delta K = KH - KM, \quad -\Delta K = KL - KM$$

When the difference $\Delta MG$ is greater than the value $\Delta K$, that is, when the actual guard opening degree MG exceeds the hatched good region in FIG. 2, the program advances from the step 307 to a step 308. When the difference $\Delta MG$ is smaller than the value $-\Delta K$, that is, when the actual guard opening degree MG is lower than the hatched good region in FIG. 2, the program advances from the step 307 to a step 309. When the difference $\Delta MG$ is between the values $\Delta K$ and $-\Delta K$, that is, when the actual guard opening degree MG is in the hatched good region in FIG. 2, the program advances from the step 307 to a step 310.

The step 308 drives the control valve 33 to increase the pressure applied to the guard actuator 31. As a result, the guard opening degree determined by the guard mechanism 24 is reduced toward the throttle fully-closed side so that the actual guard opening degree MG can fall into the hatched good region in FIG. 2.

The step 309 drives the control valve 33 to decrease the pressure applied to the guard actuator 31. As a result, the guard opening degree determined by the guard mechanism 24 is increased toward the throttle fully-open side so that the actual guard opening degree MG can fall into the hatched good region in FIG. 2.

The step 310 suspends operation of the control valve 33 to hold the pressure applied to the guard actuator 31 as it is. Therefore, the guard opening degree determined by the guard mechanism 24 remains unchanged so that the actual guard opening degree MG can stay within the hatched good region in FIG. 2.

After the steps 307, 308, and 309, the program returns to the main routine and the current execution cycle of the program segment ends.

The reiterative execution of the guard opening degree control block 417 enables the actual guard opening degree MG to follow a variation in the throttle opening degree TS and also to substantially remain within the hatched good region in FIG. 2. It is understood from FIG. 2 that, in this case, a given difference corresponding to a value of KL to KH is provided between the throttle opening degree TS and the actual guard opening degree MG.

When the difference between the throttle opening degree TS and the actual guard opening degree MG is in the good region, operation of the guard actuator 31 is suspended. Only when the difference between the throttle opening degree TS and the actual guard opening degree MG moves out of the good region, the guard actuator 31 is driven. Thus, the number of times of drive of the guard actuator 31 is small. This is advantageous in the life of the guard actuator 31 and also the electric power consumed by the guard actuator 31.

When the vehicle is required to move out of cruise control and to accelerate from a cruise control speed, the accelerator pedal 18 is depressed. In this case, since the guard opening degree is slightly greater than the throttle opening degree, the stopper 30 promptly encounters the opening degree limiting member 25 during the depression of the accelerator pedal 18. Therefore, the accelerator pedal 18 receives both the forces of the springs 23 and 26 so that the application of an appropriate level of a depressing force to the accelerator pedal 18 is required to realize the depression thereof. Thus, upon acceleration of the vehicle from the cruise control speed, the depression of the accelerator pedal 18 is not excessively easy and hence excessive depression thereof is prevented. This is advantageous in the vehicle drivability and the vehicle fuel consumption rate.

The failure detection circuit 34 which separates from the ECU 16 continues to determine whether or not the control system for the throttle valve 12 is wrong by referring to the output signal of the cruise control switch 20 and the output signal of the vehicle brake switch 36. When the control system is determined to be wrong, the failure detection circuit 35 drives the relief valve 34 to apply the atmospheric pressure to the guard actuator 31 and thereby to move the opening degree limiting member 25 toward its lowermost position. Thereby, the opening degree limiting member 25 comes into contact with the lever 27, and the throttle valve 12 is urged toward its fully-closed position by the spring 26 connected to the opening degree limiting member 25. The opening degree limiting member 25 also comes into contact with the stopper 30 so that movement of the accelerator pedal 18 can be mechanically transmitted to the throttle valve 12.

The steps 304–310 in FIG. 4 enable the guard opening degree to be controlled in response to the throttle opening degree (the actual throttle opening degree) TS which is detected by the throttle opening degree sensor 15. This design is advantageous since the control of the guard opening degree can be held reliable even in the presence of a system failure of a certain type.

As previously described, the given difference corresponding to a value of KL to KH is provided between the throttle opening degree and the guard opening degree. Thus, the difference between the throttle opening degree and the guard opening degree is variable in a given good range. It should be noted that feedback control may be executed to hold the difference between the throttle opening degree and the guard opening degree at a value corresponding to the center of the given good range.

The guard actuator 31 may use an electric motor instead of the vacuum responsive actuator. In this case, the control valve 33 and the relief valve 34 are omitted. When a system failure is detected, the electric motor in the guard actuator 31 is deenergized by the ECU 16 so that the opening degree limiting member 25 can be moved downward by the force of the spring 26.

The failure detection circuit 35 may be incorporated into the ECU 16.

DESCRIPTION OF THE SECOND PREFERRED EMBODIMENT

A second embodiment of this invention is similar to the embodiment of FIGS. 1–5 except for design changes indicated hereinafter.

In the second embodiment, each of the steps 412, 413, 414, and 416 (see FIG. 3) determines a command throttle opening degree Ts', and controls the throttle actuator 14 in response to the command throttle opening degree Ts' so that the actual degree of opening of the throttle valve 12 can be equal to the command throttle opening degree Ts'.

Figure 6:
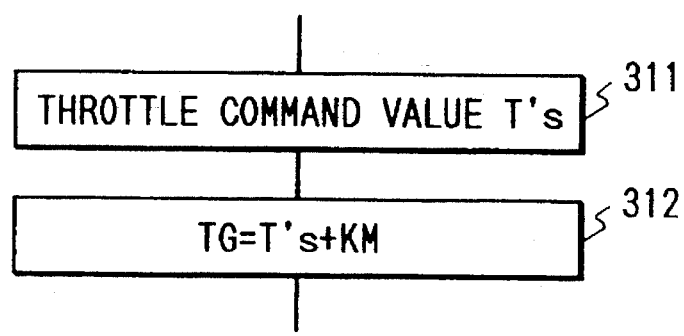
FIG. 6 is a flowchart of a portion of a program for operating an ECU in a throttle valve control apparatus according to a second embodiment of this invention.

The second embodiment includes steps 311 and 312 of FIG. 6 which replace the steps 304 and 305 of FIG. 4. The step 311 retrieves the latest command throttle opening degree Ts' determined by the step 412, 413, 414, or 416. In addition, the step 311 derives the actual current guard opening degree MG from the output signal of the guard opening degree sensor 38 (see FIG. 1). The step 312 which follows the step 311 calculates a target guard opening degree TG from the latest command throttle opening degree Ts' according to the following equation.

$$TG = Ts' + KM \quad (4)$$

Figure 7:
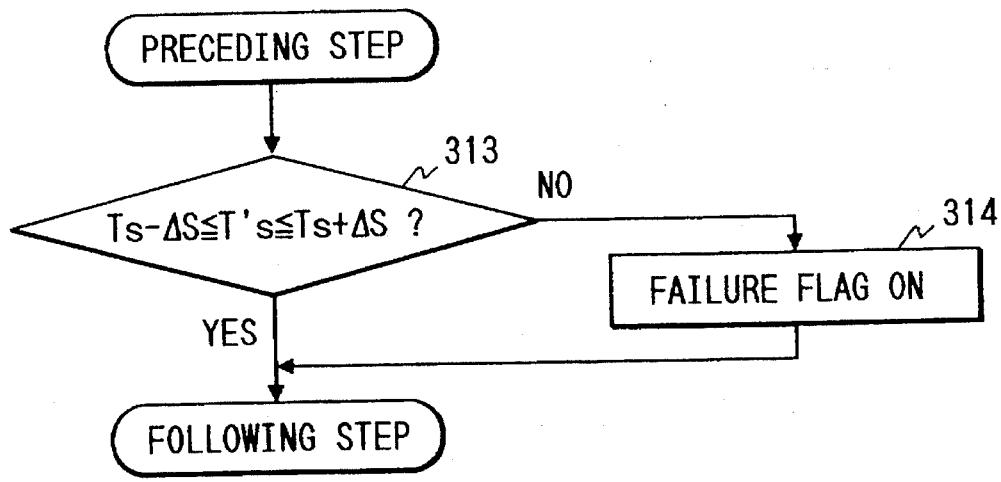
FIG. 7 is a flowchart of another portion of the program for operating the ECU in the apparatus according to the second embodiment of this invention.

The second embodiment also includes steps 313 and 314 of FIG. 7 which may be placed between the steps 312 and 306 (see FIG. 4). The step 313 derives the current degree TS of opening of the throttle valve 12 from the output signal of the throttle opening degree sensor 15. In addition, the step 313 determines whether or not the detected throttle opening degree (the actual throttle opening degree) TS and the latest command throttle opening degree Ts' are substantially or approximately equal to each other. Specifically, the step 313 determines whether or not the actual throttle opening degree TS and the latest command throttle opening degree Ts' are in the following relation.

$$TS - \Delta S \leq Ts' \leq TS + \Delta S \quad (5)$$

where $\Delta S$ denotes a predetermined small constant. When the relation (5) is not satisfied, the program advances from the step 313 to the step 314. When the relation (5) is satisfied, the program jumps from the step 313 to the following step. The step 314 sets the failure flag to the ON state. After the step 314, the program advances to the following step.

DESCRIPTION OF THE THIRD PREFERRED EMBODIMENT

A third embodiment of this invention is similar to the embodiment of FIGS. 1–5 except for design changes indicated hereinafter.

Figure 8:
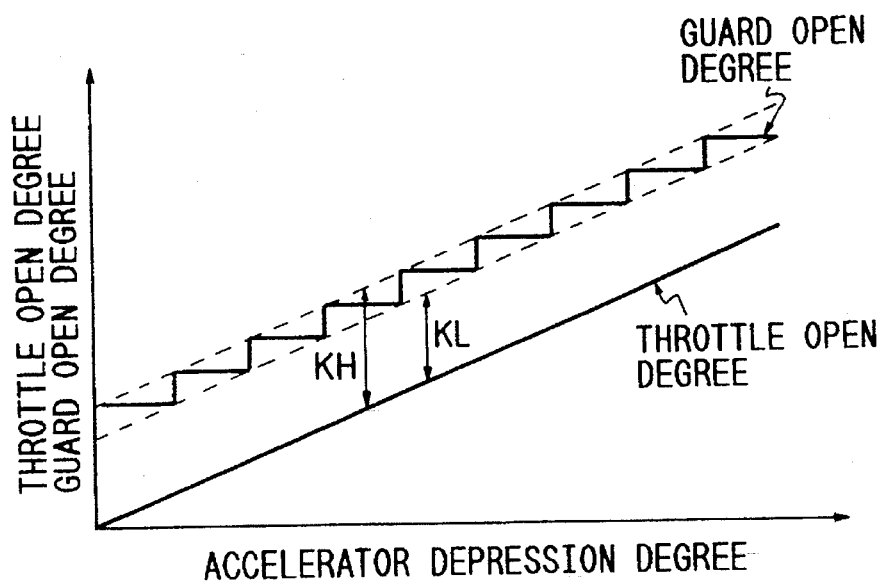
FIG. 8 is a diagram of the relation among a throttle opening degree, a guard opening degree, and a degree of depression of an accelerator pedal in a throttle valve control apparatus according to a third embodiment of this invention.

In the third embodiment, as shown in FIG. 8, the target guard opening degree increases stepwise as the degree of depression of the accelerator pedal 18 (see FIG. 1) increases. A given difference corresponding to a value of KL to KH is provided between the throttle opening degree and the guard opening degree. Thus, the difference between the throttle opening degree and the guard opening degree is variable in a given good rage. It should be noted that feedback control may be executed to hold the difference between the throttle opening degree and the guard opening degree at a value corresponding to the center of the given good range.

DESCRIPTION OF THE FOURTH PREFERRED EMBODIMENT

Figure 9:
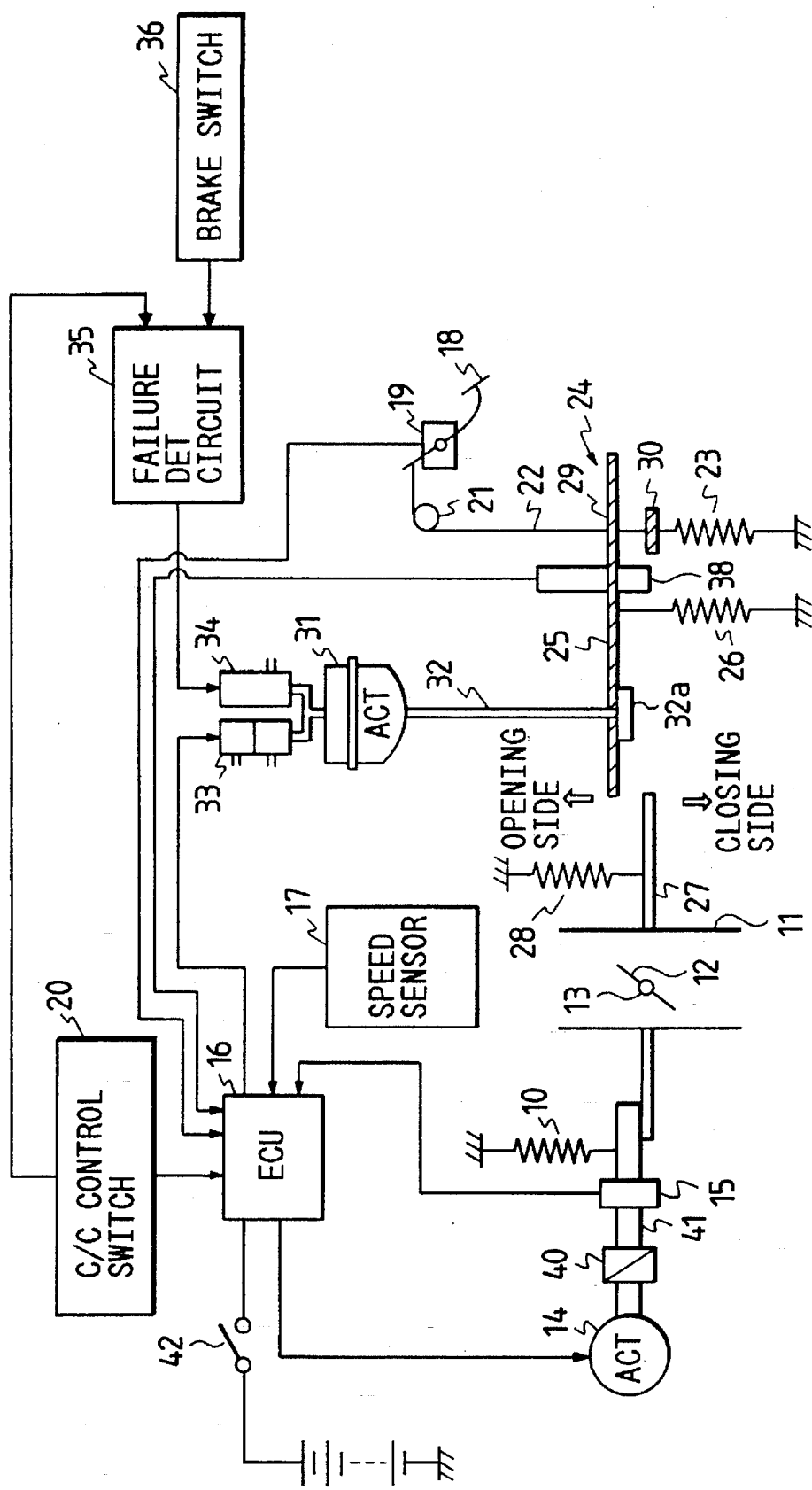
FIG. 9 is a diagram of a throttle valve control apparatus according to a fourth embodiment of this invention.

FIG. 9 shows a fourth embodiment of this invention which is similar to the embodiment of FIGS. 1–5 except for design changes indicated hereinafter.

As shown in FIG. 9, the fourth embodiment includes a reduction gear assembly 40 connected between the throttle actuator 14 and the shah 13 of the throttle valve 12. Specifically, the input side of the reduction gear assembly 40 is coupled with the throttle actuator 14. The reduction gear assembly 40 has an output shaft 41 which can be coupled with the shaft 13 of the throttle valve 12. The throttle opening degree sensor 15 is associated with the output shaft 41 of the reduction gear assembly 40. In addition, the return spring 10 is connected to the output shaft 41 of the reduction gear assembly 40.

In the fourth embodiment, the ECU 16 is informed of the current operating position of the throttle actuator 14 by the throttle opening degree sensor 15. Immediately after an automotive engine ignition switch 42 connected to the ECU 16 is changed to an ON position, the current operating position of the throttle actuator 14 is detected by the throttle opening degree sensor 15 so that feedback control responsive to the operating position of the throttle actuator 14 can be started. Therefore, an impact on the shah 13 of the throttle valve 12 can be prevented, and a throttle opening degree suited for stating of the automotive engine can be quickly obtained.

DESCRIPTION OF THE FIFTH PREFERRED EMBODIMENT

Figure 10:
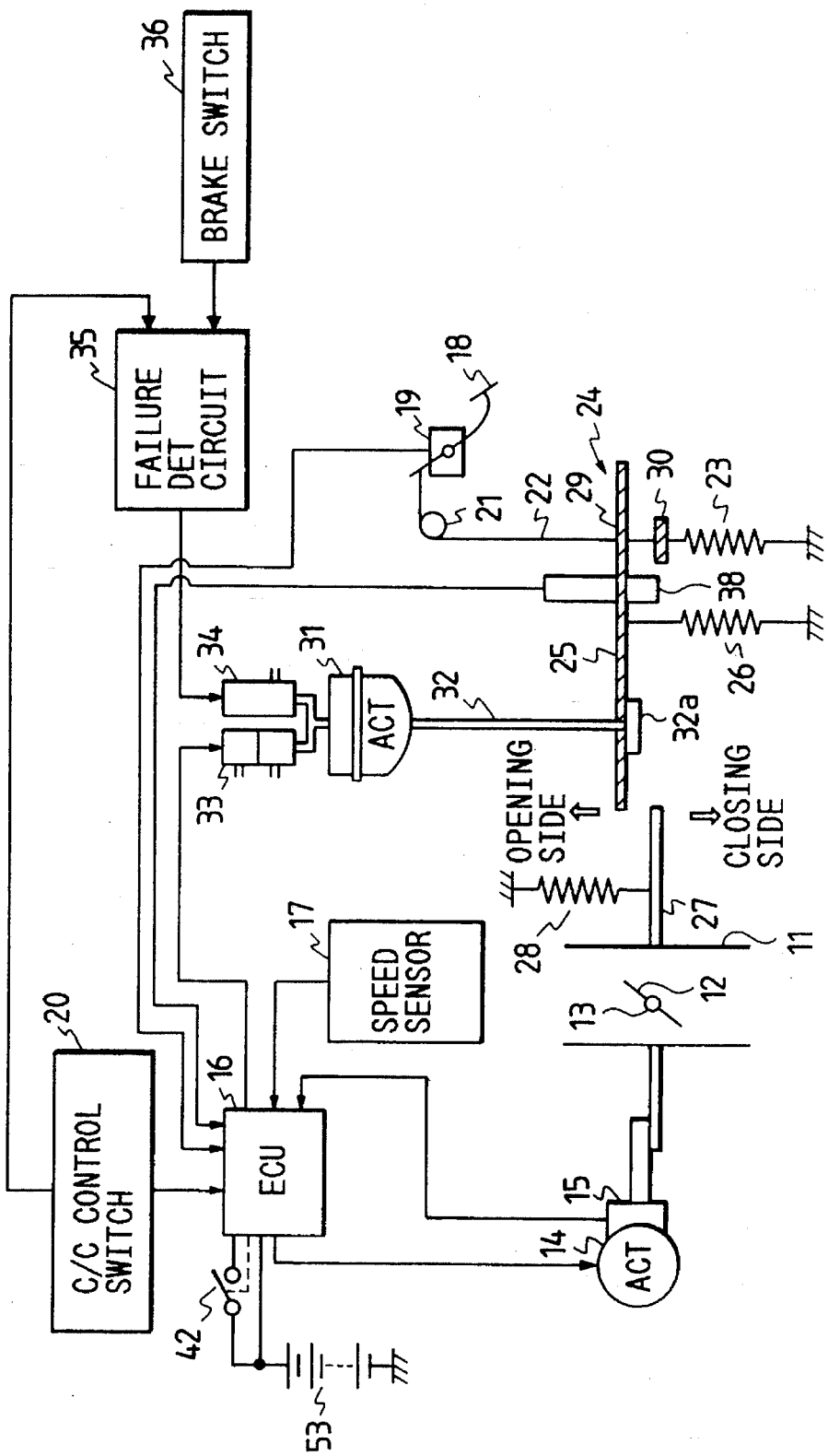
FIG. 10 is a diagram of a throttle valve control apparatus according to a fifth embodiment of this invention.

FIG. 10 shows a fifth embodiment of this invention which is similar to the embodiment of FIGS. 1–5 except for design changes indicated hereinafter.

In the fifth embodiment, as shown in FIG. 10, the throttle actuator 14 has an output shaft which can be coupled with the shah 13 of the throttle valve 12. The throttle opening degree sensor 15 is associated with the output shaft of the throttle actuator 14. The return spring 10 (see FIG. 10) is omitted. The omission of the return spring 10 enables a reduction in electric power consumed by the throttle actuator 14.

The throttle actuator 14 includes a DC motor. In the fifth embodiment, the ECU 16 includes a drive circuit for the DC motor 14 which is shown in FIG. 11.

Figure 11:
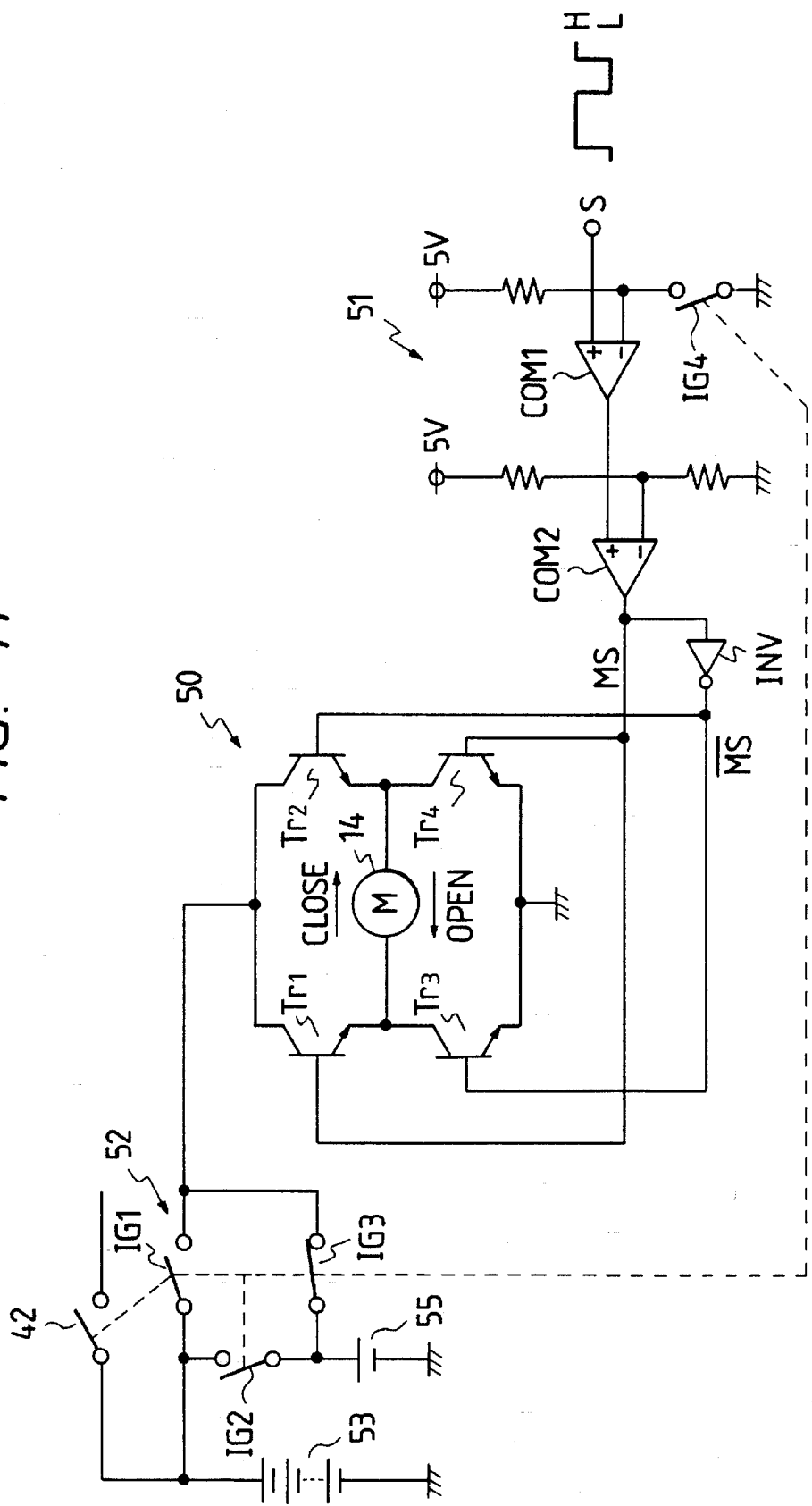
FIG. 11 is a diagram of a DC motor drive circuit in the apparatus of FIG. 10.

As shown in FIG. 11, the drive circuit includes a transistor bridge 50 for changing the direction of a current flowing through the DC motor 14. The ECU 16 generates a drive signal S of a rectangular waveform which is fed to a drive circuit 51. The drive circuit 51 serves to drive the transistor bridge 50 in response to the drive signal S. The drive circuit 51 includes comparators COM1 and COM2 and an inverter INV which are sequentially connected in cascade.

The transistor bridge 50 can be supplied with electric power from main and auxiliary batteries 53 and 55 via a switch circuit 52. The main battery 53 is an automotive battery. The switch circuit 52 includes switches IG1, IG2, IG3, and IG4. The switch IG1 is connected between the main battery 53 and the transistor bridge 50. The switches IG2 and IG3 are connected between the auxiliary battery 55 and the transistor bridge 50. The switch IG4 is connected to the inverting input terminal of the comparator COM1. The switch IG4 serves to selectively enable and disable the comparator COM1.

The switch circuit 52 is interlocked with an automotive engine ignition switch 42. Specifically, each of the switches IG1, IG2, and IG4 moves to an ON position and an OFF position when the ignition switch 42 changes to an ON position and an OFF position respectively. The switch IG3 moves to an ON position and an OFF position when the ignition switch 42 changes to the OFF position and the ON position respectively.

When the ignition switch 42 is in its ON position, the switches IG1 and IG2 are in their ON positions so that the main battery 53 supplies electric power to the transistor bridge 50 and the auxiliary battery 55. In addition, the switch IG4 is in its ON position so that the comparator COM1 is enabled. Therefore, the DC motor 14 is driven in response to the drive signal S via the transistor bridge 50 and the drive circuit 51. At the same time, the auxiliary battery 55 is charged.

When the ignition switch 42 is changed to its OFF position to stop an automotive engine, the switches IG1 and IG2 assume their OFF positions and the switch IG3 assumes its ON position so that the auxiliary battery 55 supplies electric power to the transistor bridge 50. In addition, the switch IG4 assumes its OFF position so that the comparator COM1 is disabled. Therefore; the comparator COM1 continuously outputs a low level signal independent of the drive signal S, and the output signal MS of the comparator COM2 remains at a low level. The low level output signal MS of the comparator COM2 is applied to the transistor bridge 50, allowing an electric current to flow through the DC motor 14 in a direction of opening the throttle valve 12. In this case, the auxiliary battery 55 also supplies electric power to the drive circuit 51.

The fifth embodiment may be modified into a design in which the switches IG1, IG2, IG3, and IG4 of the switch circuit 52 include electrically-controllable switches such as relay switches, and the switches IG1, IG2, IG3, and IG4 are controlled to return the DC motor 14 to its reference position and the control of the throttle valve 12 in response to only movement of the accelerator pedal 18 is executed when a malfunction of the ECU 16 or the DC motor 14 is detected.

DESCRIPTION OF THE SIXTH PREFERRED EMBODIMENT

A sixth embodiment of this invention is similar to the embodiment of FIGS. 10 and 11 except for design changes indicated hereinafter.

In the sixth embodiment, the ECU 16 periodically drives the control valve 33 in response to the difference $\Delta MG$ between the target guard opening degree TG and the actual guard opening degree MG at a control period which is chosen to reduce the number of times of periodical drive of the control valve 33.

Figure 12:
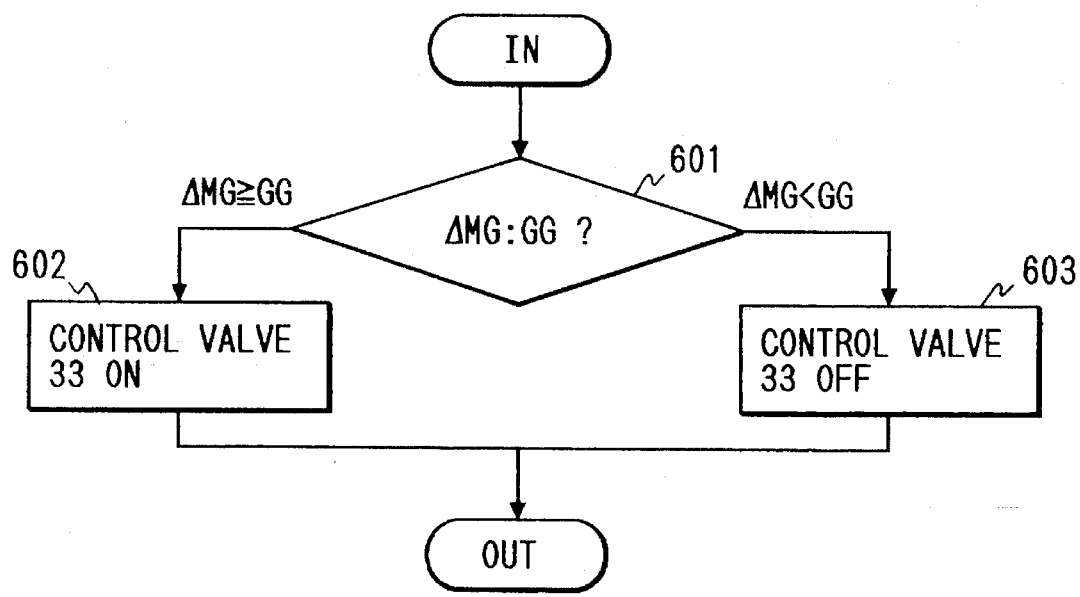
FIG. 12 is a flowchart of a portion of a program for operating an ECU in a throttle valve control apparatus according to a sixth embodiment of this invention.

The sixth embodiment includes steps 601, 602, and 603 of FIG. 12 which replace portions of the steps 307, 308, 309 and 310 of FIG. 4. Specifically, the step 601 compares the difference $\Delta MG$ with a resolution GG. When the difference $\Delta MG$ is equal to or greater than the resolution GG, the program advances from the step 601 to the step 602. Otherwise, the program advances from the step 601 to the step 603. The step 602 turns on the control valve 33 to feed a vacuum to the guard actuator 31. The step 603 turns off the control valve 33. After the steps 602 and 603, the program advances to a next step.

Thus, the control valve 33 continues to be on or off during at least the period T of reiterative execution of the related program segment. As a result, it is possible to prevent the control valve 33 from being turned on and off at an excessively high frequency. This is advantageous in the life of the control valve 33.

Figure 13:
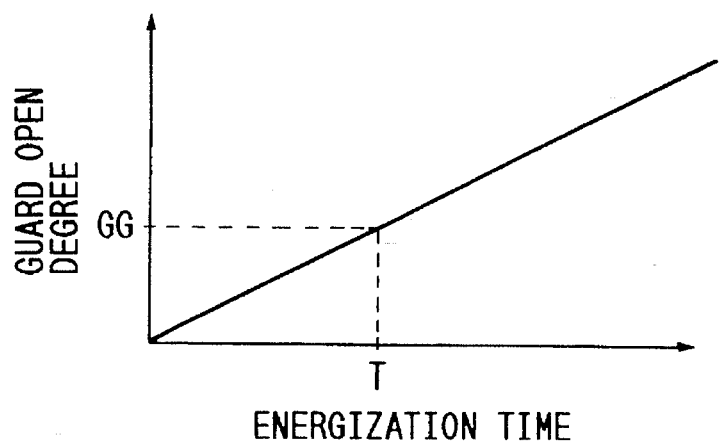
FIG. 13 is a diagram of the relation between a control valve energization time and a guard opening degree in the apparatus according to the sixth embodiment of this invention.

The period T of reiterative execution of the program segment is predetermined on the basis of a variation in the guard opening degree with respect to the time of energization of the control valve 33. As shown in FIG. 13, the period T is set equal to a time necessary for moving the guard opening degree by the resolution GG.

Figure 14:
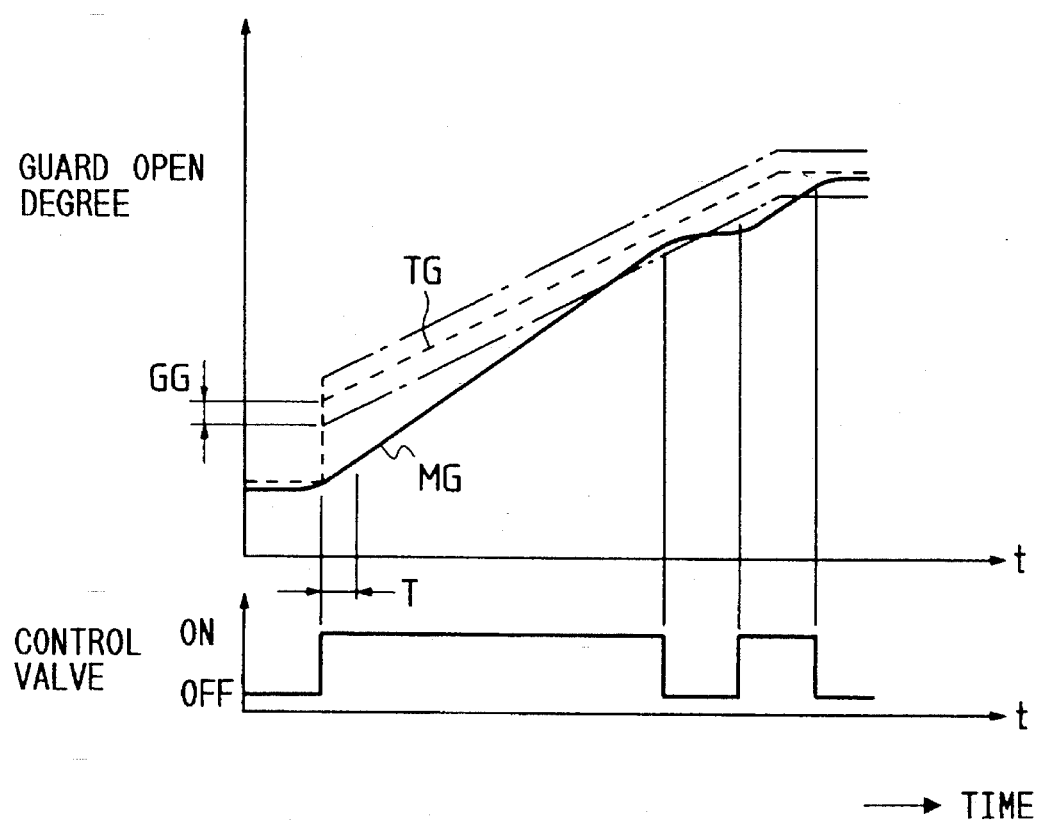
FIG. 14 is a time-domain diagram of a target guard opening degree, an actual guard opening degree, and a state of a control valve drive signal in the apparatus according to the sixth embodiment of this invention.

In the case where the target guard opening degree TG increases stepwise and then monotonically increases, the actual guard opening degree MG and the state of the drive signal to the control valve 33 vary as shown in FIG. 14. Even in the case where the difference $\Delta MG$ becomes small, the difference $\Delta MG$ is evaluated every period T. Thus, it is possible to prevent the control valve 33 from being turned on and off at an excessively high frequency.

DESCRIPTION OF THE SEVENTH PREFERRED EMBODIMENT

A seventh embodiment of this invention is similar to the embodiment of FIGS. 1–5 except for design changes indicated hereinafter.

In the seventh embodiment, characteristics of a variation in the throttle opening degree with respect to the degree of depression of accelerator pedal 18 (see FIG. 1) during vehicle acceleration from a cruise controlled state are gentler than those in normal vehicle running conditions. Thereby, fine adjustment of the vehicle speed is enabled during vehicle acceleration from the cruise controlled state. Specifically, during vehicle acceleration from the cruise controlled state, even when the accelerator pedal 18 is depressed at an excessive degree, a resultant increase in the throttle opening degree is effectively suppressed or limited. Thus, fine vehicle acceleration from the cruise controlled state is enabled.

Figure 15:
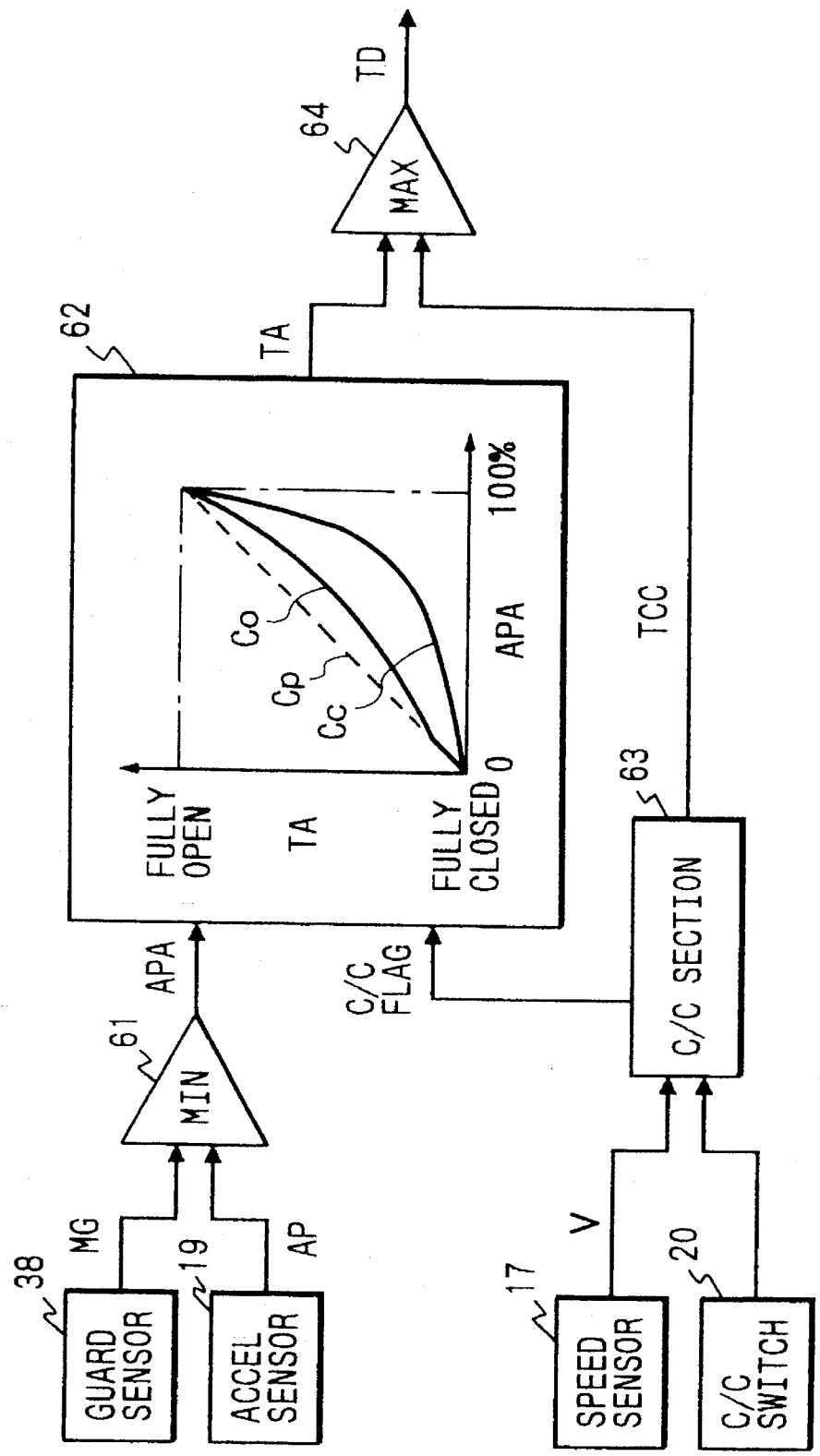
FIG. 15 is a flow diagram of operation of an ECU in a throttle valve control apparatus according to a seventh embodiment of this invention.

FIG. 15 is a flow diagram of operation of the ECU 16 (see FIG. 1) in the seventh embodiment. As shown in FIG. 15, a minimum selecting section 61 compares the accelerator depression degree (the accelerator signal) AP and the actual guard opening degree MG, and selects smaller one of the degrees AP and MG as an accelerator value APA. The operation of the minimum selecting section 61 enables the throttle opening degree to be controlled at a safe side even when one of the accelerator sensor 19 (see FIG. 1) and the guard opening degree sensor 38 (see FIG. 1) is wrong.

An accelerator target opening degree setting section 62 sets an accelerator target opening degree TA in response to the accelerator value APA according to predetermined characteristics CO or Cc shown in FIG. 15. During execution of automotive cruise control, the accelerator target opening degree TA is set in response to the accelerator value APA according to the predetermined characteristics Cc. During other conditions (normal control conditions), the accelerator target opening degree TA is set in response to the accelerator value APA according to the predetermined characteristics CO. The change between the predetermined characteristics CO and the predetermined characteristics Cc is responsive to the C/C (cruise control) execution flag given by a C/C section 63.

When the C/C switch 20 is in the position for executing automotive cruise control, the C/C section 63 calculates a C/C target opening degree TCC on the basis of the vehicle speed V informed by the vehicle speed sensor 17. The C/C target opening degree TCC is designed to hold the vehicle speed V constant.

A maximum selecting section 64 compares the accelerator target opening degree TA and the C/C target opening degree TCC, and selects greater one of the degrees TA and TCC as a throttle target opening degree TD. The ECU 16 controls the throttle actuator 14 (see FIG. 1) in response to the throttle target opening degree TD so that the actual degree of opening of the throttle valve 12 (see FIG. 1) will be substantially maintained at the throttle target opening degree TD.

As shown in FIG. 15, in a rage of small accelerator values APA, the predetermined characteristics Cc are gentler than the predetermined characteristics CO. Thus, an increase in the accelerator target opening degree TA in response to depression of the accelerator pedal 18 to execute vehicle acceleration from the cruise controlled state is smaller than that in normal vehicle running conditions.

Figure 16:
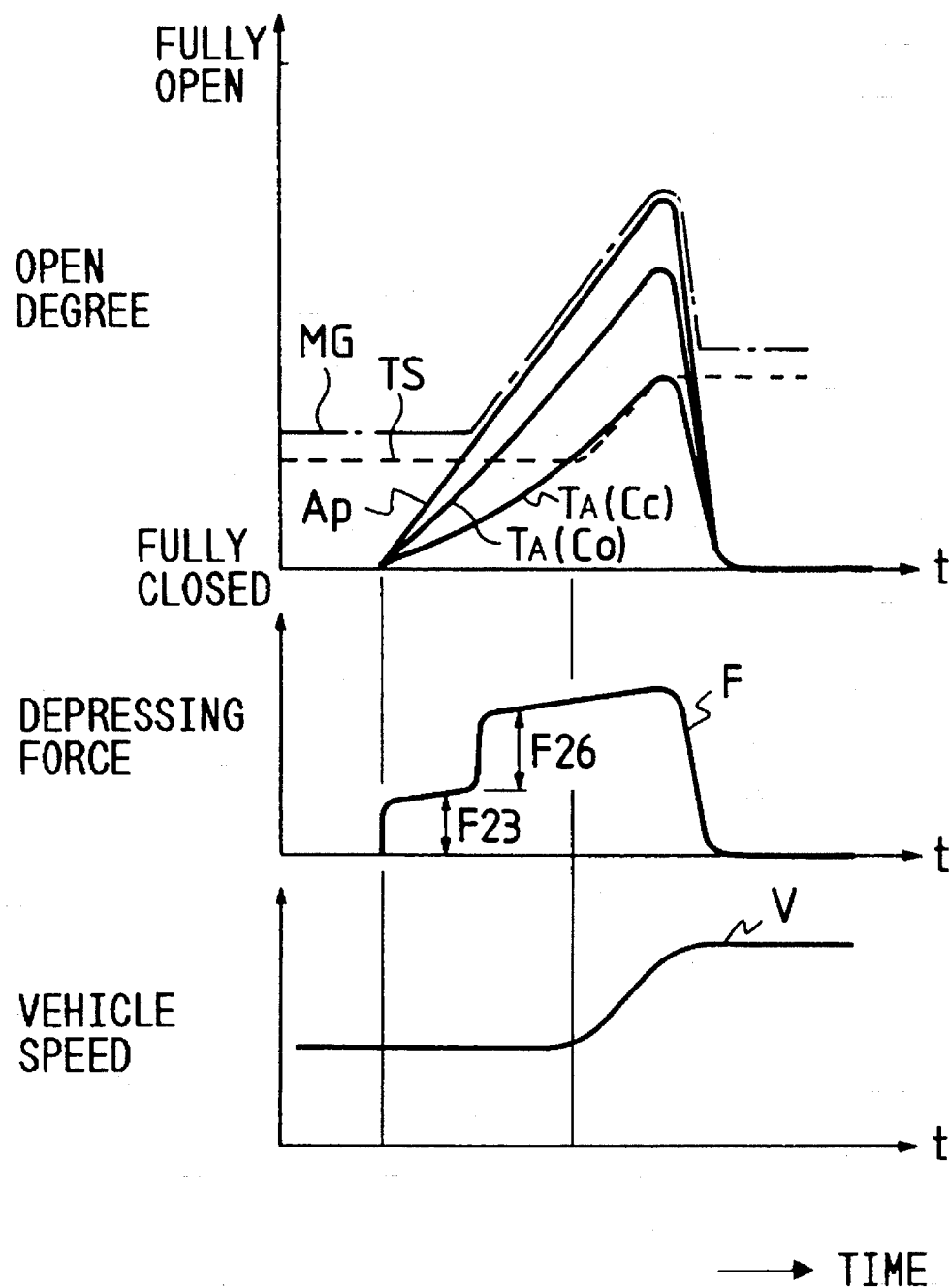
FIG. 16 is a time-domain diagram of states of various parameters in the apparatus according to the seventh embodiment of this invention.

When the accelerator pedal 18 is depressed to execute vehicle acceleration from the cruise controlled state, the actual guard opening degree MG, the throttle opening degree TS, the accelerator depression degree (the accelerator signal) AP, the accelerator target opening degree TA(C0) related to the predetermined characteristics CO, the accelerator target opening degree TA(Cc) related to the predetermined characteristics Cc, and the force F of depressing the accelerator pedal 18, the reaction force F23 of the spring 23, the reaction force F26 of the spring 26, and the vehicle speed V vary as shown in FIG. 16.

Figure 17:
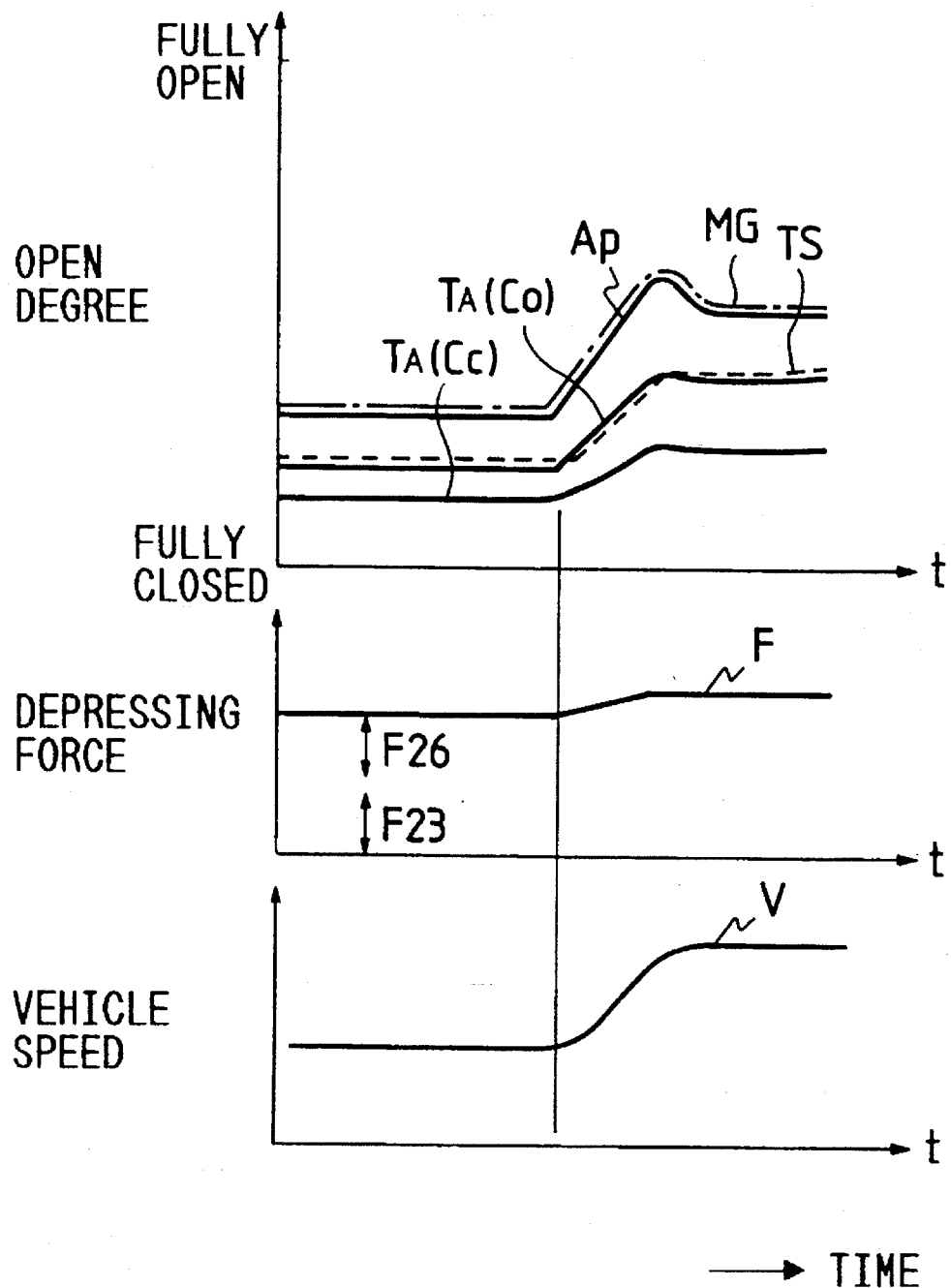
FIG. 17 is a time-domain diagram of states of various parameters in the apparatus according to the seventh embodiment of this invention.

Under normal vehicle running conditions, when the accelerator pedal 18 is further depressed to execute vehicle acceleration, the actual guard opening degree MG, the throttle opening degree TS, the accelerator depression degree (the accelerator signal) AP, the accelerator target opening degree TA(C0) related to the predetermined characteristics C0, the accelerator target opening degree TA(Cc) related to the predetermined characteristics Cc, and the force F of depressing the accelerator pedal 18, the reaction force F23 of the spring 23, the reaction force F26 of the spring 26, and the vehicle speed V vary as shown in FIG. 17.

As shown in FIG. 16, in the case where the accelerator pedal 18 is abruptly depressed to execute vehicle acceleration from the cruise controlled state, the throttle opening degree TS remains unchanged for a given interval and then starts to increase gradually. Thus, even when the accelerator pedal 18 is depressed at an excessive degree, an abrupt change in the vehicle speed is suppressed so that smooth running of the vehicle is maintained.

What is claimed is:

1. A throttle valve control apparatus for electrically driving a throttle valve which adjusts a rate of air flow into an engine mounted on a vehicle, comprising:

a lever connected to the throttle valve for movement in an opening direction and a closing direction together with the throttle valve;

an opening degree limiting member located in a side of the lever which corresponds to the opening direction and having a controllable position;

a spring urging the opening degree limiting member in a direction of closing the throttle valve;

an accelerator member;

accelerator interlocking and driving means for selectively controlling the position of the opening degree limiting member in accordance with a degree of operation of the accelerator member;

a throttle actuator for adjusting a degree of opening of the throttle valve;

a vehicle speed sensor for detecting a running speed of the vehicle;

a guard actuator for adjusting a position of the opening degree limiting member;

auto cruise control means for controlling the throttle actuator and feedback-controlling the vehicle speed detected by the vehicle speed sensor at a target vehicle speed;

guard control means for controlling the guard actuator and selectively adjusting the position of the opening degree limiting member at a position separate from a position of the lever in the opening direction during control by the auto cruise control means; and changing means for selecting and enabling control of the position of the opening degree limiting member by one of the guard control means and the accelerator interlocking and driving means.

2. The throttle valve control apparatus of claim 1 wherein the changing means comprises failure detecting means for detecting a failure of the throttle valve control apparatus, and means for replacing the control of the position of the opening degree limiting member by the guard control means with the control of the position of the opening degree limiting member by the accelerator interlocking and driving means when the failure is detected.

3. The throttle valve control apparatus of claim 1 wherein the changing means comprises determining means for determining an acceleration requirement for increasing the target vehicle speed during control by the auto cruise control means, and means for replacing the control of the position of the opening degree limiting member by the guard control means with the control of the position of the opening degree limiting member by the accelerator interlocking and driving means when an additional acceleration is detected.

4. The throttle valve control apparatus of claim 3 further comprising detecting means for detecting the degree of operation of the accelerator member, and wherein the determining means comprises means for determining the additional acceleration to be present when the degree of operation of the accelerator member exceeds an operation degree corresponding to a degree of opening of the throttle valve which is determined by the auto cruise control means.

5. The throttle valve control apparatus of claim 3 further comprising detecting means for detecting the degree of operation of the accelerator member, and normal control means for controlling the throttle actuator and adjusting the degree of opening of the throttle valve, in a range extending from the position of the opening degree limiting member in the closing direction, in response to the degree of operation of the accelerator member, and wherein the changing means comprises means for replacing the control of the position of the opening degree limiting member by the guard control means with the control of the position of the opening degree limiting member by the accelerator interlocking and driving means when the acceleration requirement is detected, and means for replacing control of the position of the throttle valve by the auto cruise control means with control of the position of the throttle valve by the normal control means when the acceleration requirement is detected.

6. The throttle valve control apparatus of claim 5 further comprising a throttle opening degree sensor for detecting the position of the throttle valve, and a guard opening degree sensor for detecting the position of the opening degree limiting member, and wherein the guard control means comprises means for feedback-controlling the position of the opening degree limiting member, which is detected by the guard opening degree sensor, at a position slightly separated from the throttle valve position detected by the throttle opening degree sensor in the opening direction.

7. The throttle valve control apparatus of claim 5 further comprising a guard opening degree sensor for detecting the position of the opening degree limiting member, and wherein the guard control means comprises means for feedback-controlling the position of the opening degree limiting member, which is detected by the guard opening degree sensor, at a position slightly separated from a target position of the throttle valve determined by the normal control means in the opening direction.

8. The throttle valve control apparatus of claim 1 wherein the throttle actuator comprises a motor having a rotatable output shaft, and a reduction gear assembly for moving the throttle valve in accordance with rotation of the output shaft of the motor.

9. The throttle valve control apparatus of claim 1 wherein the throttle actuator comprises a motor located at a side of the lever which corresponds to the opening direction, the motor being operative for moving the lever only in the opening direction, and an auxiliary battery for feeding a current to the motor to rotate the motor in the opening direction when the motor is disconnected from a main battery.

10. The throttle valve control apparatus of claim 1 further comprising a guard opening degree sensor for detecting the position of the opening degree limiting member as a guard opening degree, and wherein the guard actuator comprises an electromagnetic valve and means for moving the opening degree limiting member in the opening direction and the closing direction in response to on/off operation of the electromagnetic valve, and wherein the guard control means comprises means for deriving a difference between a target opening degree and the guard opening degree detected by the guard opening degree sensor, means for comparing the derived difference and a resolution, means for changing the on/off operation of the electromagnetic valve and feedback-controlling the position of the opening degree limiting member in a given range slightly separated from the position of the lever in the opening direction when the difference exceeds the resolution, and means for setting a control period of the electromagnetic valve on the basis of the resolution and a velocity of a variation in the position of the opening degree limiting member.

11. The throttle valve control apparatus of claim 1 further comprising detecting means for detecting the degree of operation of the accelerator member, and normal control means for controlling the throttle actuator and adjusting the degree of opening of the throttle valve, in a range extending from the position of the opening degree limiting member in the closing direction, in response to the degree of operation of the accelerator member, and wherein the auto cruise control means comprises first means for calculating a first target throttle opening degree to feedback-control the vehicle speed at the target vehicle speed, second means for calculating a second target throttle opening degree in accordance with the degree of operation of the accelerator member, and third means for controlling the throttle actuator in accordance with greater one of the first target throttle opening degree and the second target throttle opening degree, and wherein characteristics of calculation of the second target throttle opening degree by the second means are set to provide a variation in the throttle opening degree which is gentler than a variation in the throttle opening degree according to characteristics of control of the throttle opening degree by the normal control means.

12. The throttle valve control apparatus of claim 1 wherein the guard control means comprises means for adjusting the position of the opening degree limiting member at a position at which a variation in an accelerator member operating force is insensible during the operation of the accelerator member.

* * * * *